(12) United States Patent  (10) Patent No.: US 7,940,048 B2
Skultety-Betz  (45) Date of Patent: May 10, 2011

(54) LOCATING DEVICE

(75) Inventor: Uwe Skultety-Betz, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/591,882

(22) PCT Filed: Jan. 18, 2005

(86) PCT No.: PCT/EP2005/050179
§ 371 (c)(1),
(2), (4) Date: Sep. 6, 2006

(87) PCT Pub. No.: WO2005/088347
PCT Pub. Date: Sep. 22, 2005

(65) Prior Publication Data
US 2007/0188158 A1  Aug. 16, 2007

(30) Foreign Application Priority Data
Mar. 9, 2004  (DE) .......................... 10 2004 011 285

(51) Int. Cl.
*G01N 27/72* (2006.01)
*G01R 33/12* (2006.01)
(52) U.S. Cl. ........... 324/326; 324/67; 324/228; 324/239

(58) Field of Classification Search ................... 324/66, 324/67, 326, 327, 328, 329, 658, 662, 663, 324/665, 671, 672, 686; 600/424
See application file for complete search history.

(56) References Cited

U.S. PATENT DOCUMENTS

| | | | |
|---|---|---|---|
| 3,662,255 A | | 5/1972 | Garrett |
| 4,859,931 A | * | 8/1989 | Yamashita et al. ............. 324/67 |
| 5,325,873 A | * | 7/1994 | Hirschi et al. ................ 128/899 |
| 5,434,500 A | * | 7/1995 | Hauck et al. .................... 324/67 |
| 5,659,247 A | | 8/1997 | Clements et al. |
| 6,211,662 B1 | * | 4/2001 | Bijawat et al. ................. 324/67 |
| 6,259,241 B1 | | 7/2001 | Krantz |
| 6,266,006 B1 | * | 7/2001 | Audet ........................... 342/350 |
| 6,844,713 B2 | * | 1/2005 | Steber et al. .................... 324/67 |
| 2001/0007420 A1 | | 7/2001 | Bijawat et al. |
| 2002/0135347 A1 | | 9/2002 | Morgan et al. |
| 2006/0062472 A1 | * | 3/2006 | Engelberg et al. ............ 382/190 |

FOREIGN PATENT DOCUMENTS

DE  42 00 518  7/1993
* cited by examiner

*Primary Examiner* — Kenneth J Whittington
(74) *Attorney, Agent, or Firm* — Kenyon & Kenyon LLP

(57) ABSTRACT

A locating device, in particular a hand-held locating device, for detecting objects enclosed in a medium, having a housing and at least one sensor system provided in a housing, as well as an opening penetrating the device. The opening in the measuring device and penetrating the device is illuminable by at least one light source provided in the measuring device.

15 Claims, 2 Drawing Sheets

LOCATING DEVICE

FIELD OF THE INVENTION

The present invention relates to a locating device, in particular a hand-held locating device, for detecting objects enclosed in a medium.

BACKGROUND INFORMATION

Locating devices for detecting objects enclosed in a medium are commonly used in trade occupations and in finishing the interior of buildings, for example to locate electrical wiring or water pipes. In addition to carrying out the actual measurement function, the operation of the device is extremely important to the quality of the measurement result. A measuring device of high-quality technology can achieve only a poor measuring performance under practical conditions in the field if it is operated incorrectly by the user, for example if he/she makes incorrect assumptions when operating the device. For example, if the operator makes incorrect assumptions as to the sensor's precise position, it is impossible to accurately mark the location for this reason alone.

A hand-held metal detector which enables the user to qualitatively determine both the position and the depth of a metal object enclosed in a medium is described in German Patent No. DE 42 00 518 A1. In the case of this measuring device, a sensor provided with two coil pairs is used to detect hidden metal, for example in a wall, and determine the depth at which it is embedded. The sensor's two coil pairs are each connected to an oscillator and oscillate continuously at different frequencies. The signals influenced by the metal are measured and weighted for evaluation. An intensity display in the form of a bar graph characterizes the position of the enclosed metal. To mark the detected location of the enclosed metal, the locating device described in German Patent No. DE 42 00 518 A1 has a hole in the active center of the sensor through which, for example, the drill bit of a drilling machine or a marking medium is insertable. In an embodiment of the locating device described in German Patent No. DE 42 00 518 A1, for example, a stamp containing a colorant is movably positioned in this hole for the purpose of marking the detected position, for example on a wall.

A locating device for detecting objects enclosed in a medium, which transmits a directed light signal onto the surface to be examined for the purpose of displaying the position of the enclosed object behind the surface, is described in U.S. Pat. No. 6,259,241 B1. The device described in U.S. Pat. No. 6,259,241 B1 has one or a plurality of light-emitting diodes which are inserted into the housing and, when activated, can transmit a light signal which is directed onto the object to be examined via corresponding openings in the housing wall. If a sensor of the measuring device detects a corresponding measuring signal, depending on the embodiment of the locating device, either an individual or a plurality of line-shaped light signals are projected onto the object to be examined to thereby reveal to the user the presence and approximate position of the enclosed object.

SUMMARY

The locating device according to an example embodiment of the present invention for detecting objects enclosed in a medium has an opening penetrating the device which may be illuminated by at least one light source provided in the measuring device. A measuring device designed in this manner advantageously may make it possible to easily locate and mark an object enclosed in a medium. Via the opening penetrating the measuring device and the corresponding illumination of this opening, the user of the locating device according to the example embodiment of the present invention is provided with an indication of the actual measuring range of the measuring device as well as additional information, via the light signals, as to whether a corresponding measuring signal has been located in the area of the surface of the object to be detected defined by the opening.

The opening penetrating the measuring device may advantageously be positioned concentrically in relation to a coil provided in the measuring device. This may ensure that the marking is applicable to the location of maximum sensor sensitivity. The opening penetrating the measuring device may be used, for example, to guide a pencil or similar marking systems for a marking to be left on the surface of the medium to be examined and to place it accurately in the correct position. A marking to be placed through the opening onto the surface of the medium to be investigated thus marks the precise position of the object enclosed in the medium. For this purpose, the marking opening in the measuring device must pass within the coils of the inductive sensor of the measuring device. The opening penetrating the measuring device is advantageously positioned concentrically in relation to the coils to thereby mark the location of maximum sensor sensitivity as precisely as possible.

In an advantageous embodiment of the locating device according to the present invention, the opening penetrating the measuring device is formed or limited by a sleeve introduced into the measuring device housing. The sleeve, and thus also the opening penetrating the measuring device, may be illuminated by at least one light source provided in the measuring device and radiating into the sleeve material. For this purpose, the sleeve may be made of a generally transparent or semi-transparent plastic which enables the light signal supplied to the sleeve to be conducted further, thereby illuminating the entire sleeve and thus the entire opening penetrating the device. The sleeve is therefore advantageously designed to scatter light diffusively so that the light signal supplied to the sleeve in at least one location is evenly distributed over the entire sleeve.

One or more light-emitting diodes are advantageously suitable as the light source for illuminating the sleeve forming the opening penetrating the measuring device. In a particularly advantageous embodiment of the locating device according to the present invention, a plurality of light sources is provided for illuminating the opening penetrating the measuring device. In particular, it is advantageous to design the sleeve forming the opening so that it may be illuminated in different colors. This makes it possible to use an optically encoded signal to indicate to the user whether or not he/she may find an enclosed object behind the surface of the examined medium in the location defined by the opening. For example, it is possible to use the two colors green and red to indicate to the user whether he/she may drill at the location defined by the opening (for example, a sleeve illuminated in green) or whether he/she should not drill there because an object was detected (sleeve illuminated in red).

By variably illuminating the opening penetrating the measuring device, two items of information are easily and advantageously communicated to the user via a single display element. Not only does the opening penetrating the measuring device define the current examination area, but the illumination which varies as a function of the measuring signal simultaneously conveys the additional information about whether drilling, for example, may take place at the point currently being examined.

In a further example embodiment of the locating device according to the present invention, a sealing device may be provided which make it possible to seal the opening penetrating the device as a function of the measuring signal of at least one sensor. For example, a mechanical shutter may be provided in the measuring device which seals the opening penetrating the measuring device as soon as a sensor of the measuring device detects a measuring signal produced by an object enclosed in the examination area of the locating device. In addition to providing a visual display via the illuminated sleeve of the measuring device, the mechanical sealing of the opening prevents the user from making a mark or drilling if an enclosed object is present.

The opening provided in the locating device according to the example embodiment of the present invention and penetrating the measuring device and illuminated as a function of the measuring signal may be used to advantageously alert the user to the actual measuring range, the position and shape of the sensor and the presence of a positive or negative signal within this measuring range.

Further advantages of the locating device according to example embodiments of the present invention are illustrated in the following figures and in the description below.

BRIEF DESCRIPTION OF THE DRAWINGS

The figures show an exemplary embodiment of a locating device according to the present invention, which is explained in greater detail in the description below. The figures and the detailed description below describe various combinations of numerous features. Those skilled in the art will also view these features individually and combine them into additional, practical configurations which should be regarded as having been also described in this text.

DETAILED DESCRIPTION OF EXAMPLE EMBODIMENTS

Figure 1:
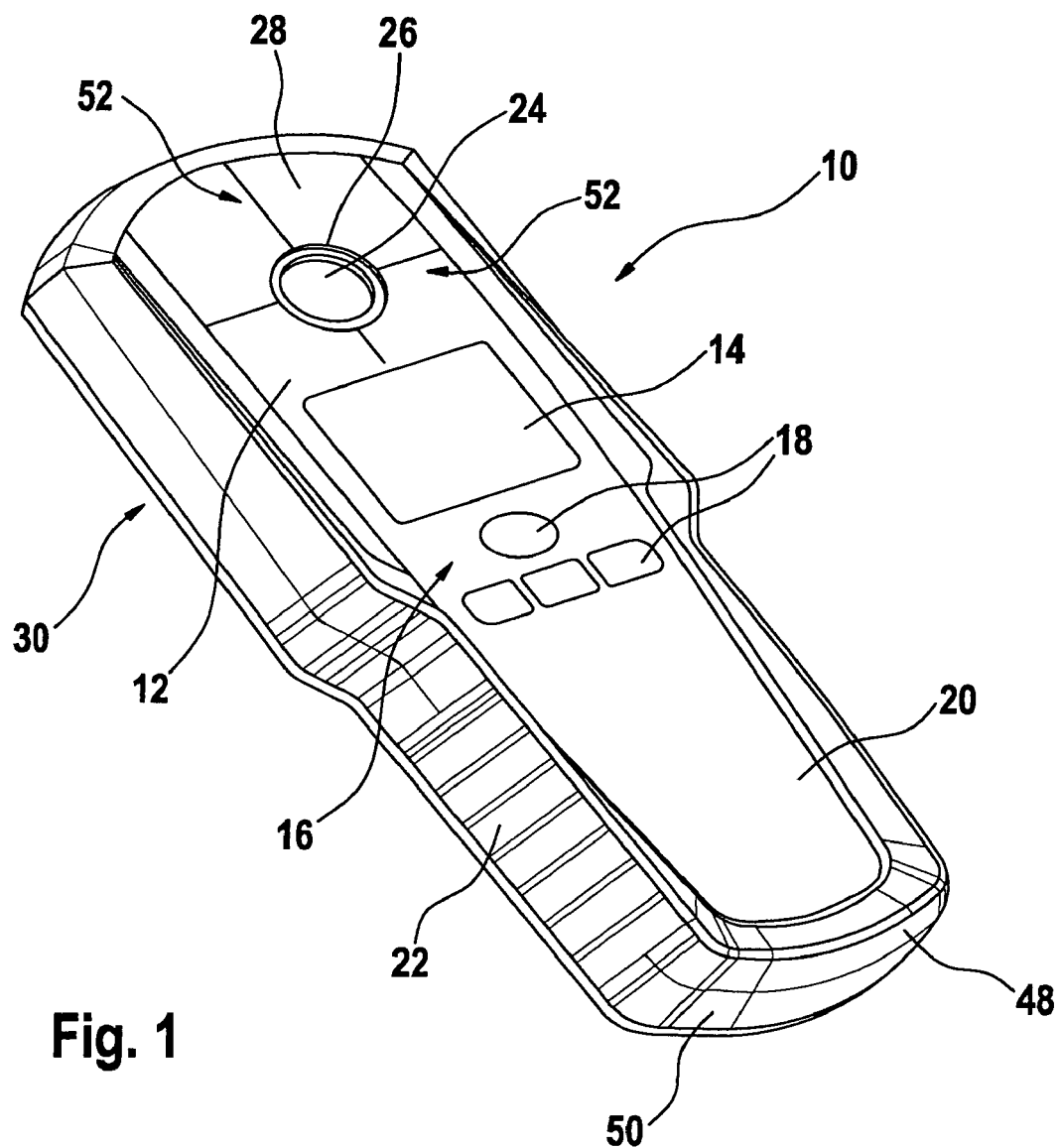
FIG. 1 shows a simplified, overall perspective view of an example embodiment of the measuring device according to the present invention.

FIG. 1 shows a perspective overview of an exemplary embodiment of locating device 10 according to the present invention. The locating device has a housing 12 which is formed from an upper and a lower shell 48 and 50, respectively. At least one sensor, in particular an inductive sensor, having a coil system for detecting metal, signal generation and evaluation electronics and a power supply system, for example using regular or storage batteries, is positioned in the interior of the housing. The device also has a display 14 for outputting an output signal which is correlated with the measuring signal. Display 14, for example a segmented bar display or a graphical LCD display, may be used to display the strength of the detected measuring signal.

The locating device according to the example embodiment of the present invention also has a control panel 16 including a series of control elements 18 which make it possible, for example, to turn the device on and off and to start a measurement.

In the area beneath control panel 16, the locating device shown in FIG. 1 has an area 20 which is designed in terms of shape and material structure as a handle 22 for guiding the locating device according to the present invention. This handle is used to pass underside 30 of the locating device over the surface of an object or a medium to be examined.

It is also possible, in the area of handle 22, to provide or attach a marking device, such as a pencil, in or to housing 12 of the measuring device. A marking pen of this type may be held, for example, in appropriate fixtures of housing 12 in the area of handle 22 or be stored, for example, in the battery compartment of the measuring device. The user may thus carry a writing implement at all times when using the device without it interfering with the work or without having to look for it after having detected an object or, for example, stick it behind his/her ear. For practical use on the construction site, pencils may be especially suitable as the marking device; however, marking device of another design, such as a scriber, may also be used.

On the side of locating device 10 opposite from handle 22, the measuring device has an opening 24 penetrating the housing. Opening 24 is formed by a sleeve 26 inserted into housing 12 as well as the upper and lower sides of the measuring device housing.

During use, underside 30 of the locating device according to the example embodiment of the present invention is passed along the surface of a medium to be examined. In the manner described below, information, in particular visual information, about the presence of an object enclosed in the medium to be examined is communicated to the user via display 14 and via illuminable sleeve 26.

In addition, the user is able to look directly through opening 24 penetrating housing 12 of the locating device and see the measuring point examined, so that any metal parts which may be located on the surface of the wall to be examined, such as the heads of nails or similar objects, are easy to detect visually and thus do not result in unwanted measurement results due to a possible misinterpretation. The center of opening 24 is visually represented by marking lines 52 provided on housing 12 of the measuring device. The opening does not necessarily have to have a round, in particular circular, cross section. For example, oval, rectangular or even square cross sections are also possible for the sleeve.

Figure 2:
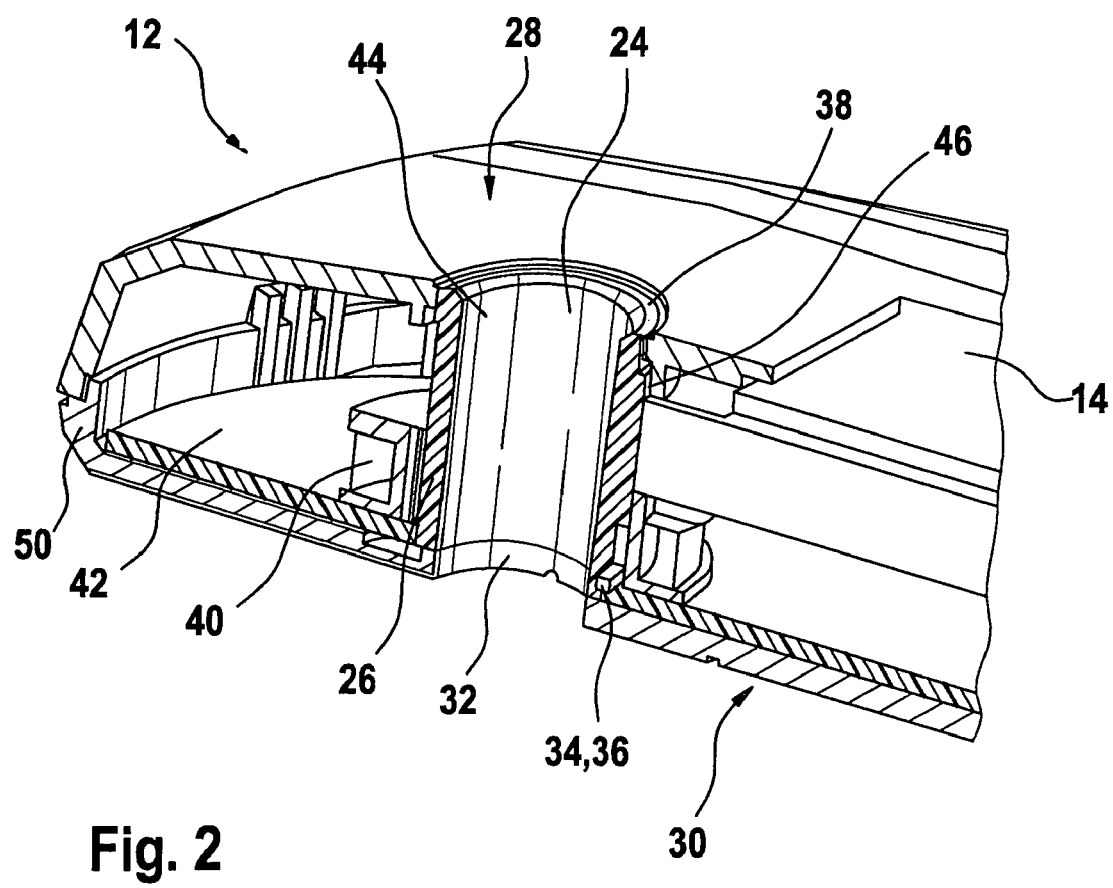
FIG. 2 shows a perspective cross section of the measuring device according to FIG. 1, in the region of the opening penetrating the housing.

FIG. 2 shows a perspective cross section of the locating device according to the present invention in the area of opening 24 penetrating the housing.

A sensor coil 40 of an inductive metal detector is located in the front part of measuring device 10, i.e., the part facing away from handle 22. The sensor coil and any corresponding electronic components needed to activate it are mounted on a p.c. board 42. The center of the sensor is therefore located at the central point of coil form 40. To enable the user of the device to use a writing implement of his/her choice to mark the location of a detected enclosed object without removing the locating device from the examined surface, housing opening 24, through which a marking pen may be inserted, is located in the center of sensor coil 40. The outer wall of housing 12 is formed by inner wall 44 of sleeve 26 in the region of the central point of the coil. In the exemplary embodiment according to FIG. 2, sleeve 26 has a round cross section to provide a good fit with the shape of the coils surrounding it. In principle, however, as indicated above, other cross sectional shapes are likewise possible. This transparent sleeve 26 may be illuminated or not illuminated by light sources 34 (e.g., light-emitting diodes) mounted on p.c. board 42, as a function of the sensor data. The shape of the illuminated surface simultaneously also indicates the sensor position to the user.

As shown in FIG. 2, opening 24 penetrating the measuring device is defined by sleeve 26 which is inserted into housing 12 of the measuring device and, in the exemplary embodiment according to FIG. 2, is supported on housing wall 32 on inner side 30 of lower shell 50 of housing 12. Sleeve 26 is made of a transparent plastic, for example a Plexiglas element into which scattering centers are integrated. Due to these scattering centers, sleeve 26 has a very good scattering capacity and excellent transparency.

A light signal may be supplied to sleeve 26 via a light source 34, which may be designed, for example, in the form of a light-emitting diode 36. Due to the high transparency and simultaneously high scattering capacity of the material of sleeve 26, the light signal supplied at certain points on the sleeve is distributed evenly within the sleeve and, in particular, is also conducted to upper edge 38 of sleeve 26 provided in the area of upper side 28 of the measuring device. This makes it possible to illuminate the interior of the channel formed by opening 24 through the measuring device and, in particular, to substantially emphasize area 38 defining the opening on upper side 28 of the measuring device via a light signal.

In the exemplary embodiment according to FIG. 2, the sleeve defining the opening penetrating the measuring device is positioned concentrically in coil system 40 of an inductive sensor of the locating device according to the present invention. However, other cross sections for the sleeve shape are also possible. In addition to coil system 40 shown in FIG. 2, the measuring device according to the present invention may also have additional coil systems as well as additional sensors for detecting objects enclosed in a medium. It is also possible to provide only one or multiple capacitive sensors in the measuring device and to position the sleeve in the direct vicinity of or inside a measuring capacitor. For this purpose, the sleeve would be able, for example, to penetrate one or more electrodes of a measuring capacitor.

Sleeve 26 is located within coil system 40 to ensure that opening 24 in the measuring device is located in the area of maximum measuring device sensitivity. This ensures that a marking placed on the surface of an examined medium through opening 24 coincides with the position of the located enclosed object as accurately as possible. The illuminable sleeve is thus used, among other things, to indicate to the user the point in his/her measuring device where the sensor is located and the precise point at which the measurement is being taken.

This also enables illuminable sleeve 26 to indicate to the user that an enclosed object has been located. For example, if a metal object is located in the examined medium via the inductive sensor, one or more light sources 34 may be activated on the basis of the detected measuring signal to illuminate sleeve 26. It is thus possible, for example, to have the sleeve flash when an object is detected. For example, it would be possible to correlate the frequency of the flashing signals with the strength of the measuring signal, thereby making it easier to delimit and determine the precise location of the enclosed object.

To optimize the detectability of the optical signal transmitted via sleeve 26, it may be desirable for transparent sleeve 26 to shine as evenly as possible in the center of the detector during illumination. Because the user ordinarily observes sleeve 26 from a relatively acute angle, it may be important for the sleeve to be fully and uniformly illuminated, especially in its upper portion.

Due to cost, in practice, generally only a small number of point-type light sources 34 are mounted on p.c. board 42. Wide-area light emitters, which would enable a uniform illumination of the sleeve, are technically more difficult to implement and are also more costly, but also represent another way to implement light source 34. The problem of even illumination may by solved by manufacturing transparent sleeve 24 from a plastic material containing optical scattering centers. The sleeve is advantageously manufactured to a certain extent from translucent glass.

A more homogeneous illumination of sleeve 26 is also achievable by providing visible inner surface 44 of transparent housing sleeve 26 with a suitable rough and thus light-scattering surface structure. If the sleeve is designed as a plastic injection-molded part, this may be accomplished by suitably eroding the corresponding surfaces of the die. Conversely, it is more advantageous to provide surfaces 46 of sleeve 26 facing the housing interior with a smooth design, which also applies, if applicable, to the lower portion of the outer surface of the housing sleeve which is poorly visible to the user. The light emitted by illumination sources 34 is to a large extent reflected on smooth surfaces and guided in the direction of visible upper outer side 38 of sleeve 36, like in an optical light conductor. This function may be further improved by providing these smooth housing surfaces with a suitable mirror coating.

In further embodiments of the measuring device according to the present invention, multiple light sources may be provided which enable light to also be supplied to sleeve 26 in different colors, thereby providing the user with information on the presence of a located object via a color-coded signal. For example, a sleeve illuminated in green may indicate to the user that he/she may safely drill in the area defined by opening 24 on the examined surface, for example up to a depth shown on the display.

The variable illumination of working sleeve 26 also makes it possible to indicate to the user whether an enclosed object was detected (for example, the sleeve is illuminated in red) or whether no measuring signals are present, which means it is safe to drill (the sleeve in this case is illuminated, for example, in green).

Alternatively, it would also be possible to correlate the intensity of the light supplied to sleeve 26 with the detection signal to provide the user with additional information about a signal variation, i.e., the direction of a rising measuring signal.

In an especially advantageous embodiment, transparent sleeve 26 of the measuring device is assigned a mechanical function in addition to the display function. This makes it possible to fix the position of p.c. board 42 within the lower portion of the housing via sleeve 26. This is especially attractive for metal detectors, since it makes it possible to eliminate a metal screw attachment in the area of sensor coil 40. A screw of this type may potentially influence the measurement performance of the metal sensor.

The locating device according to the present invention is not limited to the exemplary embodiment illustrated in the figures.

In a special embodiment of the locating device according to the present invention, therefore, a sealing mechanism may be provided which enables opening 24 penetrating the device to be automatically sealed as a function of the measuring signal of a sensor. In this embodiment, it would be possible, for example, to indicate a detected object enclosed behind the examined surface to the user via an illuminated signal of sleeve 26, opening 24 being simultaneously sealed, for example by a mechanical shutter mechanism, to avoid, for example, a hole in the region of the located object.

The locating device according to the present invention is not limited to the use of the inductive sensor or, in particular, the use of only one coil system. Additional, for example capacitive, sensors may be advantageously provided in the housing of the locating device. To locate an object enclosed in a medium as precisely as possible, using the locating device according to the present invention, opening 24 penetrating the locating device should be positioned in the active center of the sensors.

The measuring device according to the present invention may also be designed as a capacitive measuring device.

What is claimed is:

1. A hand-held locating device for detecting an object enclosed in a medium, comprising:
   a housing, including a single hollow opening penetrating therethrough;
   at least one sensor system enclosed within an interior of the housing, the at least one sensor system surrounding the single hollow opening;
   evaluation electronics enclosed within the interior of the housing in which the sensor system is also enclosed;
   at least one light source provided in the measuring device configured to illuminate the single hollow opening; and
   a handle attached to the housing, the handle situated in close proximity to the housing so as to permit an operator to grasp the handle while operating a device for marking a surface of the medium;
   wherein the medium is situated outside of the locating device.

2. The locating device as recited in claim 1, wherein the sensor system has at least one inductive sensor for locating purposes.

3. The locating device as recited in claim 1, wherein the sensor system includes at least one capacitive sensor.

4. The locating device as recited in claim 1, wherein the hollow opening is formed by a sleeve, the light source configured to illuminate the sleeve.

5. The locating device as recited in claim 4, wherein the sleeve is made of an at least partially transparent plastic.

6. The locating device as recited in claim 4, wherein the sleeve is configured to scatter light diffusively.

7. The locating device as recited in claim 1, the hollow opening is illuminated with a color-coded light signal.

8. The locating device as recited in claim 7, wherein the hollow opening is illuminable in at least two different colors.

9. The locating device as recited in claim 1, wherein the hollow opening is variably illuminated as a function of a measuring signal of at least one sensor.

10. The locating device as recited in claim 1, wherein the light source includes a plurality of light sources.

11. The locating device as recited in claim 1, wherein the at least one light source is a light-emitting diode (LED).

12. A hand-held locating device for detecting an object enclosed in a medium, comprising:
   a housing, including a hollow opening penetrating therethrough;
   at least one sensor system enclosed within an interior of the housing, the at least one sensor system surrounding the hollow opening;
   evaluation electronics enclosed within the interior of the housing in which the sensor system is also enclosed;
   at least one light source provided in the measuring device configured to illuminate the hollow opening; and
   a handle attached to the housing, the handle situated in close proximity to the housing so as to permit an operator to grasp the handle while operating the device for marking a surface of the medium;
   wherein the medium is situated outside of the locating device,
   wherein the sensor system has at least one inductive sensor for locating purposes,
   wherein the inductive sensor includes a coil, the hollow opening being oriented concentrically in relation to the coil of the inductive sensor.

13. A hand-held locating device for detecting an object enclosed in a medium, comprising:
   a housing;
   at least one sensor system enclosed within an interior of the housing;
   evaluation electronics enclosed within the interior of the housing in which the sensor system is also enclosed, wherein the housing, which encloses the sensor system and the evaluation electronics in the interior, includes a opening penetrating therethrough;
   at least one light source provided in the measuring device configured to illuminate the opening;
   a handle attached to the housing, the handle situated in close proximity to the housing so as to permit an operator to grasp the handle while operating the device for marking a surface of the medium;
   wherein the medium is situated outside of the locating device; and
   a sealing device which allows the opening to be sealed as a function of a measuring signal of at least one sensor.

14. A hand-held locating device for detecting an object enclosed in a medium, comprising:
   a housing, including a hollow opening penetrating therethrough;
   at least one sensor system enclosed within an interior of the housing, the sensor system having at least one inductive sensor for locating purposes, the sensor being situated concentrically in relation to the hollow opening and surrounding the hollow opening;
   evaluation electronics enclosed within the interior of the housing in which the sensor system is also enclosed;
   at least one light source provided in the measuring device configured to illuminate the hollow opening; and
   a handle attached to the housing, the handle situated in close proximity to the housing so as to permit an operator to grasp the handle while operating the device for marking a surface of the medium;
   wherein the medium is situated outside of the locating device.

15. A hand-held locating device for detecting an object enclosed in a medium, comprising:
   a housing, including a single hollow opening penetrating therethrough;
   at least one sensor system enclosed within an interior of the housing, the at least one sensor system surrounding the single hollow opening;
   evaluation electronics enclosed within the interior of the housing in which the sensor system is also enclosed;
   a display positioned on the housing;
   a control panel positioned on the housing, having control elements for operating the hand-held locating device;
   at least one light source provided in the measuring device configured to illuminate the single hollow opening; and
   a handle attached to the housing, the handle situated in close proximity to the housing so as to permit an operator to grasp the handle while operating a device for marking a surface of the medium;
   wherein the medium is situated outside of the locating device.

* * * * *